United States Patent [19]
Maglio et al.

[11] Patent Number: 5,277,931
[45] Date of Patent: Jan. 11, 1994

[54] COMPOSITE ION-EXCHANGE MATERIAL, PREPARATION AND USE THEREOF

[75] Inventors: Alfonse Maglio, River Edge; Francis L. Himpsl, Freehold, both of N.J.; Robert V. Russo, Brooklyn, N.Y.

[73] Assignee: Engelhard Corporation, Iselin, N.J.

[21] Appl. No.: 934,084

[22] Filed: Aug. 21, 1992

[51] Int. Cl.$^5$ .................. B05D 7/00; B05D 1/36
[52] U.S. Cl. .................. 427/212; 427/214; 427/333; 427/419.1
[58] Field of Search .......... 427/212, 214, 333, 419.1; 502/417, 182, 407; 252/179, 184

[56] References Cited

U.S. PATENT DOCUMENTS

| | | | |
|---|---|---|---|
| 1,584,716 | 5/1926 | Behrman. | |
| 1,868,565 | 7/1932 | Connolly. | |
| 2,165,578 | 7/1939 | Rembert | 23/110 |
| 3,522,187 | 7/1970 | Krauss et al. | 252/182 |
| 3,663,283 | 12/1972 | Hebert et al. | 106/288 |
| 3,864,142 | 2/1975 | Kovarik | 117/100 |
| 4,069,295 | 1/1978 | Sugahara et al. | 423/49 |
| 4,177,142 | 12/1979 | Halbfoster | 210/75 |
| 4,178,270 | 12/1979 | Fujita et al. | 252/447 |
| 4,282,092 | 8/1981 | Fujita et al. | 210/682 |
| 4,362,626 | 12/1982 | Takeuchi et al. | 210/670 |
| 4,364,908 | 12/1982 | Rahm et al. | 423/86 |
| 4,400,305 | 8/1983 | Takeuchi et al. | 252/430 |
| 4,563,298 | 1/1986 | Keiser | 252/313.2 |
| 4,587,232 | 5/1986 | Kawamura et al. | 502/400 |
| 4,591,455 | 5/1986 | Macedo et al. | 252/629 |
| 4,628,042 | 12/1986 | Speronello | 502/263 |
| 4,692,431 | 9/1987 | Wella | 502/417 |
| 4,801,386 | 1/1989 | Sugimori et al. | 210/680 |
| 4,802,985 | 2/1989 | Sugimori et al. | 210/502.1 |
| 4,855,059 | 8/1989 | Frianeza-Kullberg | 210/670 |
| 4,929,582 | 5/1990 | Dosch et al. | 502/11 |
| 4,971,729 | 11/1990 | White | 252/625 |
| 4,987,116 | 1/1991 | Karl et al. | 502/427 |
| 5,049,309 | 9/1991 | Sakamoto et al. | 252/313.1 |
| 5,051,189 | 9/1991 | Farrah | 210/679 |
| 5,053,139 | 10/1991 | Dodwell et al. | 210/688 |
| 5,066,404 | 11/1991 | Komatsu et al. | 210/670 |
| 5,133,871 | 7/1992 | Levy | 210/688 |

FOREIGN PATENT DOCUMENTS 0372132 of 1990 European Pat. Off. .

OTHER PUBLICATIONS

Cotton and Wilkinson, "Advanced Inorganic Chemistry", Fifth Edition.

Desai and Baxi, "Ion-Exchange Properties of Titanium Silicates", Indian Journal of Technol., vol. 16, (1978) pp. 204-206.

Desai and Baxi, "Preparation and Ion-Exchange Properties of Tin Silicates", Indian Journal of Technol., vol. 16 (1978) pp. 201-203.

Primary Examiner—Shrive Beck
Assistant Examiner—David M. Maiorana

[57] ABSTRACT

Inorganic hydrated metal oxide and metal silicate gels are supported on the surface of particles of porous material by precipitation therein without significant deposit within pores of the support material and without encapsulating the particles of porous material. Especially preferred hydrated oxides and silicate gels are those of titanium. Preferred porous particles are composed of carbon.

These novel composite materials are prepared by spraying an aqueous basic material onto the porous particles and then spraying a concentrated aqueous acidic solution of a source of suitable metallic ions so as to rapidly form a gelatinous precipitate on the surface of the porous particles which remain porous.

14 Claims, 2 Drawing Sheets

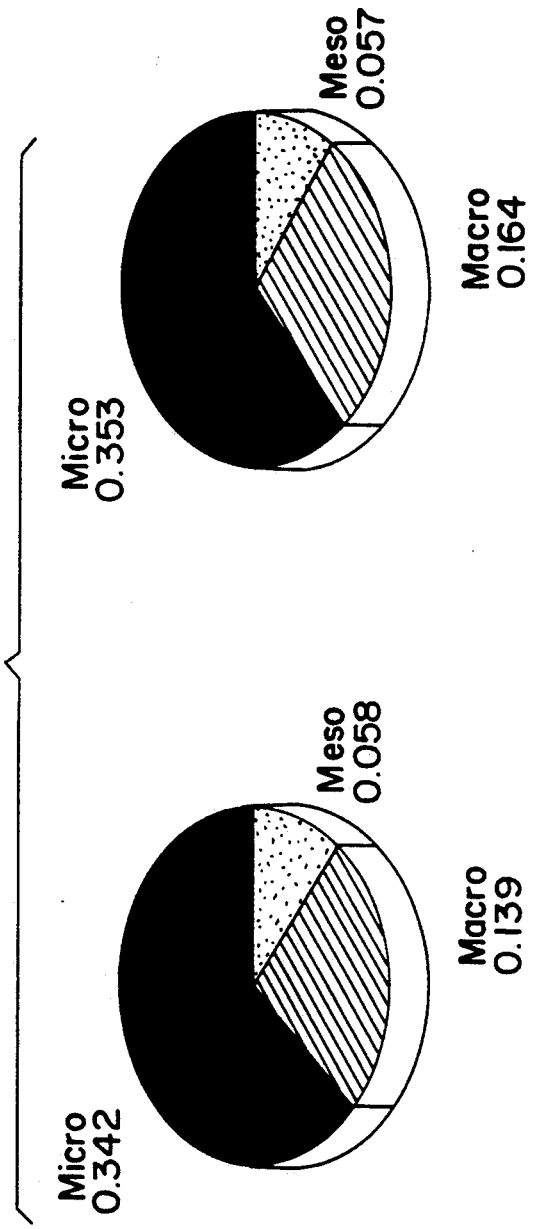

COMPOSITE ION-EXCHANGE MATERIAL, PREPARATION AND USE THEREOF

BACKGROUND OF THE INVENTION

The use of amorphous hydrated metal oxide and amorphous metal silicate gels to remove various metals from aqueous solutions is notoriously old in the art. The patent and technical literature contains many examples of such techniques. It was recently discovered that certain amorphous titanium and tin silicate gels demonstrated remarkable rates of uptake for heavy metal species such as lead, cadmium, zinc, chromium and mercury which are an order of magnitude greater than that of prior art absorbents or ion exchangers under the conditions tested which include the presence of competing ions such as calcium and magnesium. The combination of extraordinary lead selectivity, capacity and uptake rates, permitted such materials to strip lead from aqueous streams with minimal contact time, allowing direct end use in filters for water purification, be it under-the-counter or under-the-faucet, or whole-house devices. See U.S. Pat. No. 5,053,139.

Granular activated carbon (GAC) is also used in water purification or remediation processes, in some cases in combination with inorganic metal ion-exchangers. GAC improves taste, odor and smell by adsorbing ionic metals, organic molecules and colloidal particles. GAC also removes chlorine by reducing the chlorine to chloride ions.

The adsorption properties of GAC are dependent upon the pore volume and pore size distribution of the material. Small organic materials., e.g., volatile organic compounds (VOC) such as chloroform, are adsorbed into the micropores (pores less than 20 angstroms in diameter). Larger organic materials, e.g., herbicides or pesticides or colloidal particles are adsorbed in the mesopores (pores between 20 and 500 angstroms). The macropores (pores between 500–2K angstroms) are least important for adsorption, but do trap larger sediment particles.

Prior art directed to composites of support particles such as activated carbon and inorganic ion-exchangers include U.S. Pat. No. 4,692,431, Weller and U.S. Pat. No. 4,178,270, Fujita, et al. These patents deal with the problem of providing mechanically strong particles of inorganic ion-exchangers and do so by precipitating metal oxide gels on support materials. With efforts directed to securing an effective bond between these components, patentees did not attempt to utilize significantly the inherent benefit of the porous support itself to bind material not captured by the inorganic ion-exchanger. Thus, Weller intentionally deposited precipitated metal oxide within pores of a carbon support. Fujita, et al. relied on utilizing a support and precipitated metal oxide having opposite zeta potential while ignoring the possibility of retaining porosity in the support.

BRIEF DESCRIPTION OF THE DRAWINGS

FIG. 2 is a graphic presentation of the pore size distribution of granular activated carbon (GAC) before and after being superficially coated with a representative metal ion-exchange material.

SUMMARY OF THE INVENTION

Figure 1:
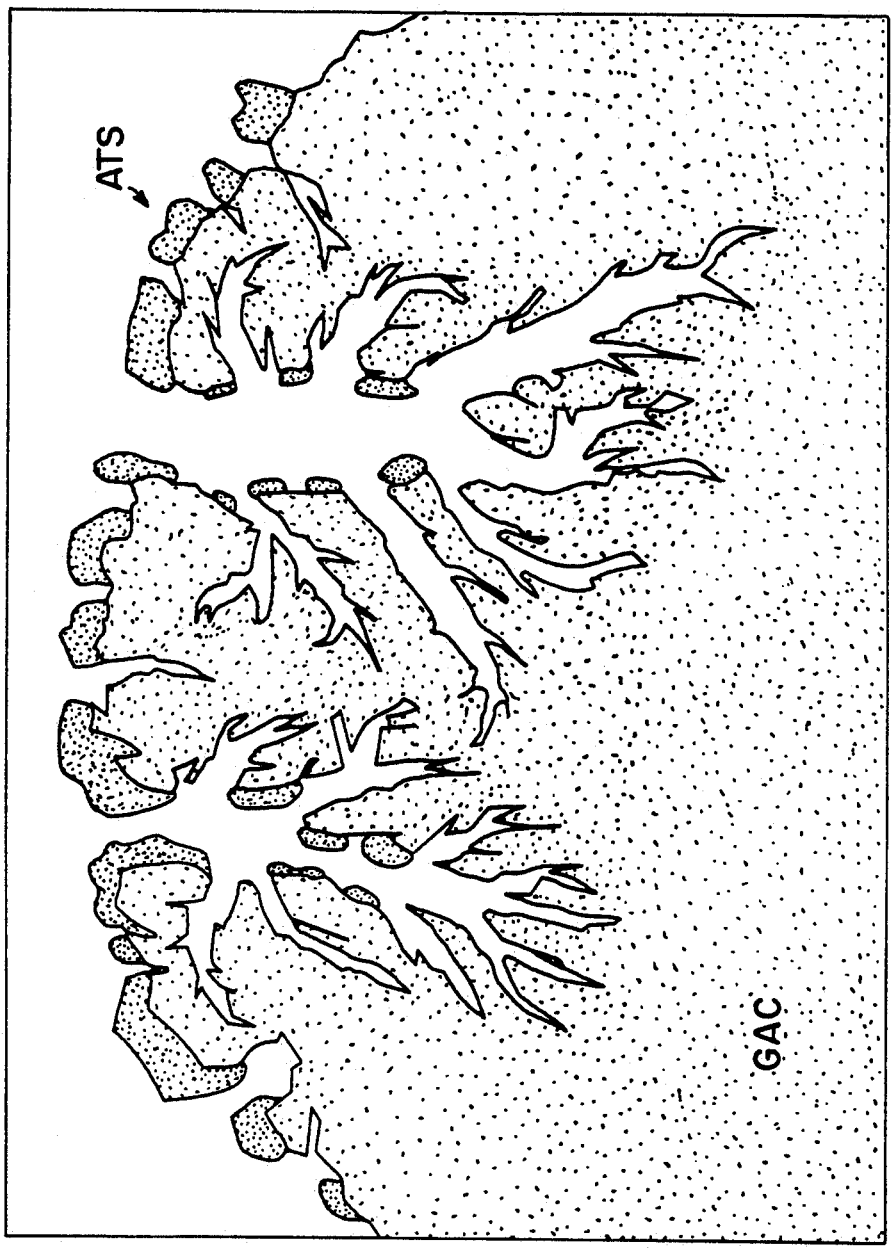
FIG. 1 is a schematic drawing of a composite particle containing porous support material superficially coated with inorganic ion-exchange material, in accordance with the invention.

We have now found that hydrated metal oxide and metal silicate gels are admirably suited to remove metallic ions in water, such as, for example, lead from drinking water in the presence of competing ions normally found in drinking water, when small amounts of the gels are supported on the surface of granular particles of porous material by rapid precipitation thereon without significant deposit within pores of the support and without encapsulating the particles of porous support material, whereby pores in the support material are available to remove materials not removed by the inorganic gel. The phrase "superficially coated" refers to this condition.

Hydrated metal oxides and metal silicate gels within the scope of the invention are known ion-exchangers. Most preferred gels are those of titanium. Preferred porous particles are composed of granular active carbon.

Also, in accordance with this invention, novel composite material useful for water purification are prepared by adding an aqueous basic material to the porous particles, preferably by spraying, and then immediately adding, also, preferably by spraying, a concentrated aqueous acidic solution of a source of suitable metallic ions so as to rapidly form a gelatinous precipitate of sorbent on the surface only of the porous particles, without encapsulating the particles. In other words, the precursors of the gelatinous precipitate are not wicked into pores, at least small pores, of the porous particles.

Our invention represents a radical departure from prior art composites based on a porous support containing an inorganic ion-exchanger. In diametric contrast with Weller, supra, we do not deposit ion-exchanger within pores of support. We employ processing steps including, inter alia, reversal of order of addition of base and metal salts used by Weller as well as differences in quantities of reagents used. Contrary to Fujita, et al., who also require precipitation of metal salts by addition of base in practice of their invention, we must reverse the sequence of addition of base and acid salt to precipitate metal gel from a basic system. Further we also use controlled amounts of metal salts to obtain a. satisfactory product. Fujita, et al. give examples (Comparative Examples 2 and 5) of precipitating titania by adding base to a carbon support pretreated with titanium tetrachloride solution. Patentees, who report that the results were unsatisfactory, did not utilize the spraying technique employed in practice of the present invention and they made no effort to prevent deposition in the pores of the carbon.

DETAILED DESCRIPTION OF THE INVENTION

Based upon porosity measurements evaluations by microscopic techniques on numerous samples of representative products of the invention, it has been discovered that an inorganic gel ion-exchanger can be formed in-situ primarily on the surface of the porous carbon granules used as a support material. A very small amount of the amorphous gel sorbent, however, may form in the large macropores of the support. This is illustrated in the attached FIG. 2. Porosity data supporting this is shown in Example 6. Nonpenetration of inorganic ion-exchanger into GAC represents an important advantage. The benefits of "coating" GAC while maintaining microporosity is two fold: a more efficient use of the inorganic ion-exchanger sorbent for ion exchange applications is realized; and the utilization of the micropores for adsorbing VOC (volatile organic compounds) which is one of the major benefits of using GAC in potable water applications.

Composite sorbents of the invention are useful in potable water applications for remediating lead to under the 15 ppb action level set by the EPA for public water systems. Typically, such particles are from 20 to 200 mesh (U.S. Standard). The composite sorbent product could be utilized by filter producers who would incorporate the composite sorbent into custom designed filters and POU devices (point of use), e.g. countertop units, carafes and end of tap units. In addition to lead removal, such users would be concerned with eliminating or minimizing taste, odor and chlorine properties. Its these later concerns that are directly related to performance in removing VOC as well as THM (trihalomethanes). Those skilled in the art will readily select particle sizes appropriate for the intended end use. For example, products of the invention would be of benefit for use in applications where there is a need to employ particles larger than 200 mesh to assure useable sufficient surface area and contact time for remediation of potable water.

It is within the scope of the invention to provide composites in which other components are also present in the composite, e.g., silver for biostatic properties.

Certain procedures and selection of precursor materials favor the retention of ion-exchange materials on the outside of porous particles. Wetting properties will determine whether reagents wick into pores of a particle or not. Wetting properties are dependent upon interfacial free energies of solid-liquid interfaces and are best illustrated by contact angle values, where an angle close to zero represents spontaneous spreading and an angle over 90° indicates that liquids bead up and run off of surfaces (nonwetting). Physical properties such as viscosity and hydrophobicity may be adjusted to influence the contact angle. For example, diluting the impregnating liquid with water may reduce its viscosity to the point that the impregnating liquid can wick into the porous substrate. Conversely, use of concentrated reagents minimizes or avoids wicking. The time allowed and/or method of addition of the reagents to the porous substrate are important to prevent wicking. For example, immersing the porous substrate into a solution of the reagent and heating for one hour (as in example 1 of Weller, U.S. Pat. No. 4,692,431) or for 24 hours (as in example 1 of Fujita, et al., U.S. Pat. No. 4,178,270) will allow sufficient time for impregnation of the reagents into the pores. Spraying concentrated reagents onto the surface of a porous substrate does not allow sufficient time for wicking especially if the second reagent is added immediately after the first, thus causing the neutralization reaction to proceed upon the surface of the substrate, before any wicking into the pores can begin. Thus one has process variables such as contact time, temperature, pressure or concentration which may be adjusted to minimize wicking.

Also various reagent combinations which favor non-wicking may be utilized. For instance, if the carrier is organic (hydrophobic) in nature use of a hydrophilic reagent or solution would minimize wicking into the pores of the carrier.

Inorganic ionic exchangers within the scope of the invention are amorphous by x-ray analysis and include hydrous metal oxides and silicate of metals of Groups IVa, Va, VIIa and IVb of the Periodic Table (previous IUPAC form) Cotton and Wilkinson "Advanced Inorganic Chemistry", Fifth Edition. Preferred metals are titanium zirconium, niobium, manganese and tin. Mixtures of metals may be employed. In some cases minor amounts of crystalline material may be present in the amorphous gel. Preferably, chloride salts are employed although salts of other anions such as nitrate and fluoride may be utilized.

Carriers or supports may be any porous material such as kieselguhr, dehydrated aluminas, chromias, charcoal, porous silicas and aluminas, gamma alumina, etc. The support material should be in the form of coherent particles which are sufficiently chemically inert towards reagents used to produce the gelatinous precipitate to maintain coherent form during and after formation of that precipitate.

It is desirable to employ carriers having pore sizes (total porosity) between 0.1 to 1.0 cc/g. When porosity exceeds 1.0 cc/g, the particles may lack requisite integrity to survive forces of attrition to which they are subjected during use. On the other hand, when porosity is less than about 0.1 cc/g, VOC performance may be insufficient. Especially recommended are carriers having total porosity between about 0.2 to 0.6 cc/g. The term "total porosity" as used herein refers to values obtained by nitrogen adsorption (for micro and mesopores) as well as mercury intrusion for larger pores. The term "micropore" refers to pores having diameters below 20 Angstrom units as determined by nitrogen porosimetry. "Mesopores" refers to pores having diameters in the range of 20 to 500 Angstrom units (nitrogen adsorption). "Macropores" refers to pores having diameters in the range of 500 to 20,000 Angstrom units (mercury porosimetry). Techniques and equipment used to make these measurements are described in U.S. Pat. No. 4,628,042.

In the case of coating with metal silicates such as titanium silicate, the molar ratio of metal/$SiO_2$ added is about unity prior to washing. Normally some silica is removed following washing. In all cases sufficient metal salt is added to neutralize previously applied base. Use of concentrated base and concentrated acid, both being introduced by spraying rather than immersion is conducive to avoidance of wicking. Because the metal compounds used rapidly form precipitates, deposition on the surface only of support particles is facilitated. A feature of the invention is that sufficient base is used to neutralize the subsequently added source of metal. This would be sodium hydroxide (to produce hydrated metal oxide) or sodium silicate, possibly enriched with sodium hydroxide if the $Na_2O/SiO_2$ of the silicate is low (to precipitate metal silicate). Spraying of basic solution followed by spraying of metal salt solution can be repeated two or more times, provided the total level of hydrated metal oxide or silicate added is not so great that the support is encapsulated and micro and mesopores are filled.

After precipitation of the inorganic ion-exchanger, the particles should be thoroughly washed to remove by-product salts. Useful amounts of metal hydroxides or silicates to be superficially coated on the porous carrier particles are set forth in the accompanying examples. Higher levels than those used in examples could possibly enhance the ion exchange capacity, but may cause an increase in fines due to lower adhesion and abrasion of the superficial coating from the support. At some point the concentration of precipitate will be so high that it will encapsulate the support particles and thus block entry into the pores, resulting in a drop off of VOC performance. Total amounts of precipitated gels may vary with the particle size and pore structure of the support particles and are readily determined by carrying out porosity measurements.

The observed experimental variation in the pore size distribution between untreated coconut shell carbon and the same carbon superficially coated in accordance with this invention is represented in FIG. 2. The micropore volume difference of 0.353 vs. 0.342 cc/g is within experimental error of the measurement. The mesopore volume remains unchanged; 0.057 vs. 0.058 cc/g. Only the macropore volume shows a reduction from 0.164 in the untreated carbon to 0.139 cc/g in the superficially coated carbon. These results are consistent with the schematic drawing of the composite particle shown in FIG. 1. The metal silicate ion-exchange material resides primarily on the outer surface of the particle, with a minor amount penetrating into a few of the macropores.

EXAMPLE 1

In this example, illustrating practice of this invention, a superficial coating of amorphous titanium silicate was applied to the surface of porous activated carbon granules via an initial impregnation with sodium silicate solution, followed by a second impregnation with titanium oxychloride solution, $TiOCl_2$. The combination of these reagents resulted in an exothermic neutralization reaction with the net result being formation of amorphous titanium silicate gel and sodium chloride (which was later removed by washing). The amounts of reagents added to the carbon granules was adjusted to result in a 1:1 molar ratio of $SiO_2:TiO_2$. Additional caustic in the form of NaOH was added to the sodium silicate solution so that neutralization resulted, i.e., the resultant molar ratio of Na:Cl was 1.0.

In this example, 200 g of bituminous carbon granules (Calgon Corporation type TOG, 20×50 mesh) was spray impregnated with a viscous solution containing 28.2 g N ® brand sodium silicate solution (8.93% $Na_2O$, 29.2% $SiO_2$), 32.8 g of a 50% NaOH solution, and 6.0 g $H_2O$. Following this, 50.0 g of commercial (Kemira, Inc.) titanium oxychloride solution (21.9% $TiO_2$, 34.8% Cl) was spray impregnated onto the silicate-containing carbon granules. This resulted in an exothermic reaction upon contact, with the liberation of water vapor, yielding a product dry in appearance and free-flowing.

Following the reaction, the impregnated carbon granules were slurried in 1 liter $H_2O$, yielding a pH of 7.8. Fines generated during impregnation were removed by multiple decanting with deionized water, until a clear supernatant was obtained. The product was then further washed and wet-screened (60 mesh) prior to oven drying.

The finished titanium silicate coated carbon granules showed a uniform surface coating upon SEM examination and Si/Ti mapping via EDX. The granules exhibited a BET surface area of 708 $m^2/g$, nitrogen porosity (20-500Å)=0.082 $cm^3/g$, and mercury porosity (500-20,000Å)=0.116 $cm^3/g$.

After ignition of a portion of the sample at 1100° F. to remove carbon, the VF (volatile free) content of the material was found to be 10.1%. To determine the extent to which the gel adhering to the carbon granules was exchangeable, a simple test was conducted in which a 10.0 g sample was slurried in 1000 g of 1000 ppm $Pb^{+2}$ solution (provided as $Pb(NO_3)_2$), filtered, and samples of both filtrate and influent solution were analyzed for lead. This test revealed a net uptake of 0.16 g lead (as $Pb^{+2}$), translating to a total lead exchange capacity of 1.6%. Granular titanium silicate samples (no carbon) had lead exchange capacities of ca. 15-20%, measured in an identical manner. Hence, for the titanium silicate gel/carbon system, a net titanium silicate content of approx. 10% is indicated, correlating with the result given by ignition.

To test the effectiveness of the amorphous titanium silicate/carbon material in the pour-through type carafe filter application, a 178.5g sample (20/60 mesh) was packed into a cylindrical bed 4.0 inch O.D., 1.4 inch in depth, covering the bed top and bottom with 60 mesh nylon screen so as to contain the bed. This filtration bed was then subjected to a continuous flow stream of lead nitrate/chlorine (via OCL.) doped tap water, containing nominally 150 ppb $Pb^{+2}$ and 4 ppm Cl. The stream was passed through the filtration bed at a nominal flow rate of 0.1 GPM. Samples of the effluent stream were collected at 5 gallon intervals, then analyzed for lead and chlorine content. The results appear in Table I.

TABLE I

Lead Removal Using Titanium Silicate/Carbon

| Gallons Influent Passed | Effluent $Pb^{+2}$ (ppb) | Effluent Cl (ppm) |
|---|---|---|
| 5 | <2 | NF (<30 ppb) |
| 10 | <2 | NF |
| 15 | <2 | NF |
| 20 | <2 | NF |
| 25 | <2 | NF |
| 30 | <2 | NF |
| 35 | <2 | NF |
| 40 | <2 | NF |
| 45 | <2 | NF |
| 50 | <2 | NF |
| 55 | <2 | NF |
| 60 | <2 | NF |
| 70 | <2 | NF |
| 75 | <2 | NF |
| 80 | <2 | NF |
| 85 | <2 | NF |
| 90 | 3 | NF |
| 95 | 5 | NF |
| 100 | 18/22* | NF |
| 105 | 11* | NF |
| 110 | 11* | NF |
| 115 | 9* | NF |
| 120 | 19* | NF |
| 125 | 11* | NF |
| 130 | <2 | NF |
| 135 | <2 | NF |
| 140 | <2 | NF |
| 145 | <2 | NF |
| 150 | <2 | NF |
| 155 | 2 | NF |
| 160 | <2 | NF |
| 165 | <2 | NF |
| 170 | <2 | NF |
| 175 | 2 | NF |
| 180 | <2 | NF |
| 185 | <2 | NF |
| 190 | <2 | NF |
| 195 | <2 | NF |
| 200 | <2 | |

*High lead analyses marked by an asterisk were traced to a by-pass situation (channeling) in the filtraion bed. After correction, the bed continued to remove lead to the detection limit. as shown by the data

EXAMPLE 2

This example illustrates a 2x laboratory scale-up of the titanium silicate coated carbon preparation described in Example 1. The reagents and methodology used in this example were identical to those used in Example 1 with the following modifications: 400 g carbon granules, 56.4 g N-Brand silicate solution, 65.6 g of 50% NaOH solution, 12 ml $H_2O$, 100 g $TiOCl_2$ solution. Of the titanium silicate coated carbon granules thus prepared, a 151.5 g sample 20×60 mesh was packed into a 4.0 inch O.D. × 1.0 inch deep bed of similar construction to Example 1. Testing was then initiated under continuous flow conditions (0.1 GPM) as before, but in this example the pH and total dissolved solids (TDS) levels were adjusted so as to be in accordance with Standard Method #53 of the National Sanitation Foundation; specifically, conditions were used to conform to the NSF-53 "high pH/high TDS" test. Actual conditions employed were pH=8.5, TDS=270ppm, $Pb^{+2}$=150ppb. Results are reported in Table II.

TABLE II

| Lead Removal Using Titanium Silicate/Carbon Media | |
|---|---|
| Gallons Influent Passed | Effluent $Pb^{+2}$ (ppb) |
| 43 | 5 |
| 47 | 5 |
| 89 | 14 |
| 110 | 6 |
| 125 | 2 |
| 130 | 4 |
| 140 | 3 |
| 149 | <2 |
| 161 | <2 |
| 211 | 5 |
| 233 | 4 |
| 246 | 3 |

EXAMPLE 3

This example demonstrates that for a given amount of titanium silicate, performance is substantially improved if the titanium silicate is formed in-situ upon carbon granules compared to a simple physical mixture of the two, even if the physical mixture contains higher levels of titanium silicate. This unexpected result is attributed to the improved mass transfer that results from spreading the active (increasing surface area) component over a greater number of particles.

A performance comparison between the process of the invention using titanium silicate and physical mixtures was shown by a comparable side-to-side experiment. A flow through filter housing with a 4 inch O.D. × 1 inch depth was filled completely with 118.7 grams of the titanium silicate/carbon composite described in Example 2. This sample contained an estimated 12 grams of pure titanium silicate ion-exchanger (based on the loss of ignition test described in Example 1). A second filter housing of identical dimensions and construction was filled with 20 grams of Engelhard ATS ™ sorbent (titanium silicate granules, 20×60 mesh, prepared according to the teachings of U.S. Pat. No. 5,053,139) and 100 grams of activated carbon of the identical type used to prepare the titanium silicate/carbon composite. The sample for this experiment was screened −20 +60 on U.S. Standard Sieves.

The above-filled filter cartridges were challenged with a lead test solution prepared according to the "Twenty-five Gallon Lead Test Procedure" described in U.S. Pat. No. 5,053,139, with the exception that the solution was prepared to 80 gallons using the same proportions of ingredients. For each filter cartridge, a one gallon container with a 4 inch opening on the bottom was attached to hold influent solution. The above-described challenge solution was pumped into each container at the controlled rate of 0.1 GPM, which is typical for household carafe type purification devices. The solution was allowed to flow by gravity through each filter, and the concentration of lead in the effluent determined at the cumulative gallonage reported in Table III:

TABLE III

| | ppb Lead in Effluent | |
|---|---|---|
| Gallons Passed | Titanium/Silicate and Carbon Composite | Physical Mixture |
| 5 | — | 17 |
| 10 | — | 28 |
| 15 | — | 19 |
| 20 | 7 | 27 |
| 25 | — | 30 |
| 35 | 6 | — |
| 75 | 5 | — |
| 95 | 3 | — |
| 150 | 3 | — |
| 170 | 2 | — |
| 190 | 3 | — |

Data in Table III clearly show that the physical mixture (containing nearly twice as much titanium silicate as the titanium silicate/carbon composite) passed nearly ten times as much lead compared to the subject invention.

EXAMPLE 4

Preparation/Testing of other Carbon-Supported Metal Silicates A. Al/Si/C

Carbon-supported aluminum silicate gel was prepared in a manner similar to that reported in Example 1 using the same grade of GAC, with the principal exception that aluminum chloride was substituted for titanium oxychloride. For this, as well as subsequent preparations, the total moles of silica impregnated was maintained constant, as was the M/Si molar ratio (at unity). Sufficient caustic was added in each case to neutralize completely the respective metal chloride. For convenience in making a comparison, refer to Example 1.

In this example, 200 g of carbon granules (Calgon TOG 20X50 mesh) was spray impregnated with a solution containing a 28.2 g N-Brand silicate solution (8.93% $Na_2O$, 29.2% $SiO_2$), 15.2 g of a 50% NaOH solution and 23.6 g $H_2O$. Following this, the granules were spray impregnated with a solution containing 33.1 g $AlCl_3 \cdot 6H_2O$ dissolved in $H_2O$ to a total volume of 50 ml. Following reaction, the material was washed, screened and dried as previously reported in Example 1.

The Al/Si/C sample thus prepared was evaluated for lead removal effectiveness via carafe testing similar to that described in Example 2 at 0.1 GPM, using a 4.0 inch O.D. × 0.75 inch deep bed of media, and the NSF-53 "high pH/high TDS" testing conditions with a lead influent concentration of 150 ppb. The results are shown by the data below:

| Performance of Al/Si/C Sample | |
|---|---|
| # gallons | ppb Effluent Lead |
| 17 | 35 |
| 25 | 20 |

-continued

| Performance of Al/Si/C Sample | |
|---|---|
| # gallons | ppb Effluent Lead |
| 32 | 29 |

In contrast, a sample of the titanium silicate/C prepared in accordance with the subject invention performed for at least 200 gallons.

| Performance of Titanium Silicate/C Control | |
|---|---|
| # gallons | Effluent ppb Lead |
| 17 | 8 |
| 25 | 5 |
| 32 | 5 |
| 54 | 17 |
| 69 | 15 |
| 90 | 6 |
| 105 | 9 |
| 118 | 7 |
| 138 | 3 |
| 158 | 6 |
| 177 | 7 |
| 194 | 5 |

To determine the equilibrium exchange capacity of the Al/Si/C, a 10.0 g sample was slurried in 1000 g of 1000 ppm lead solution (provided as $Pb(NO_3)_2$), filtered, and samples of both filtrate and influent solution were analyzed for lead. This test revealed a net uptake of 0.10 g Pb, translating to a total lead exchange capacity of 1.0%. In comparison, exchange capacity for titanium silicate/C is 1.6–2.4%.

B. Sn/Si/C

In an analogous manner, a 200 g sample of Calgon carbon granules was impregnated with a solution containing 28.2 g N-Brand silicate, 21.5 g 50% NaOH solution and 17.3 g $H_2O$. Following this, the sample was impregnated with a solution containing 35.7 g $SnCl_4$ and 34 ml $H_2O$. The washing/drying procedures described in Example 1 were employed.

In carafe testing, poorer results were achieved relative to titanium silicate/C when tested under the same conditions.

| Performance of Sn/Si/C Sample | |
|---|---|
| # gallons | Effluent ppb Lead |
| 21 | 20 |
| 36 | 18 |
| 46 | 15 |

The equilibrium lead uptake of the Sn/Si/C was 2.0%, similar to that realized with titanium silicate/C.

C. Nb/Si/C

A carbon-supported niobium silicate analogue was prepared similarly, using a 200 g carbon granule sample onto which was sprayed a solution containing a 28.2 g N-Brand silicate, 27.8 g 50% NaOH solution, and 11.0 g $H_2O$. Following this, the granule sample was then sprayed with a solution containing 37.0 g $NbCl_5$ in a total volume of 50 ml $H_2O$. This sample was not as effective as the titanium silicate/C when evaluated under the same test condition.

| Performance of Nb/Si/C Sample | |
|---|---|
| # gallons | Effluent ppb Lead |
| 10 | 12 |
| 25 | 12 |
| 38 | 10 |

The equilibrium lead capacity of this sample was 1.8%, similar to that of titanium silicate/C.

EXAMPLE 5

Preparation/Testing of Carbon-Supported Titanium Hydroxide

To evaluate the effectiveness of a carbon-supported titanium hydroxide prepared by the method of this invention, a 200 g sample of Calgon 20×50 mesh carbon granules was spray impregnated with 76.2 g 50% NaOH solution. Following this, the granular sample was spray impregnated with 97.2 g of commercial titanium oxychloride solution (Kemira, Inc. 21.9 % $TiO_2$, 34.8% Cl). The relative amounts of reagents used were pro-rated upwards, since removal of N-Brand silicate from the preparation afforded additional surface area which could be utilized to accommodate a higher loading of impregnating solution. After successive impregnation steps, the sample was washed and dried as in the case of Example 1.

Carafe testing of the carbon-supported titanium hydroxide sample (under the same conditions described previously) demonstrated excellent lead removal performance, similar to that observed with titanium silicate/C.

| Performance of Ti/C Sample A | |
|---|---|
| # gallons | Effluent ppb Lead |
| 7 | 5 |
| 18 | 3 |
| 38 | 8 |
| 57 | 9 |
| 74 | 4 |
| 103 | 12 |
| 119 | 9 |

The equilibrium lead uptake of the carbon-supported titanium hydroxide sample was 2.6%.

EXAMPLE 6

The mercury porosimetry and nitrogen adsorption data appearing in Table IV were obtained from representative samples of porous carbon products (bituminous carbon and coconut shell carbon) uncoated and superficially coated with titanium silicate in accordance with this invention. These data substantiate that precipitated amorphous titanium silicate did not wick into the pores of the porous carbon support particles.

TABLE IV

| (cc/g) | Micro + Meso pore vol | Macro pore vol | Total pore vol |
|---|---|---|---|
| Bituminous Carbon | .3209 | .1225 | .4434 |
| Titanium Silicate on Bituminous Carbon | .3158 | .1209 | .4367 |
| Coconut Carbon | .4010 | .164 | .574 |
| Titanium Silicate | .4000 | .139 | .539 |

TABLE IV-continued

| (cc/g) | Micro + Meso pore vol | Macro pore vol | Total pore vol |
|---|---|---|---|
| on Coconut Carbon | | | 5 |

The fact that only 1.6% of bituminous carbon and 0.2% of coconut carbon porosity of micro and mesopores was reduced by application of the titanium silicate coating confirmed that the titanium silicate superficially coated the particles of porous carbon.

Washing studies have also shown that the amount a (percentage) of titanium silicate in the product drops off with higher attrition in washing. This is consistent with precipitated titanium silicate being abraded off the outside of the carbon particles.

Scanning electron microscopy (SEM) does not lend itself to definitive interpretation of pore size information. SEM data should usually be used with caution since the results rarely represent a statistical average of a total sample. However, SEM of products of the invention did indicate that most of the titanium silicate was on the outside of the carbon granules.

Preferred embodiments of the invention and their utility have been described in detail. Products of the invention are also useful in remediation of heavy metals, other than lead. A composite sorbent such as the one of Example 1 has shown limited effectiveness for removing mercury and cadmium as well as anionic arsenic from water. As an example, arsenic remediation of ground water in the western US might become a reality at water utility companies by utilizing titania gel impregnated anthracite carbon. This type of carbon does not have high micropore volume and is used primarily for filtering sediment (rather than removing VOCs). Thus a larger granule size would be more applicable (usually 10×30 mesh). Other but less preferred materials which may be used as the support material for this application are those that are less expensive than high purity porous carbon or a material which would allow easy separation from the other system components, e.g., garnet, filter sand and anthracite.

We claim:

1. A method for preparing a composite particulate ion-exchange material which comprises:
   (a) providing granules of a porous support;
   (b) spraying a concentrated aqueous solution of a base onto the surface of said granules of porous support in amount sufficient to coat the surface of said granules but insufficient to fill pores therein, the quantity of base in said solution being sufficient to precipitate metal ions in a concentrated aqueous acidic metal salt solution subsequently applied in step (c);
   (c) before said aqueous solution of base has sufficient time to wick into pores of said granules, spraying said granules with a concentrated acidic aqueous solution of a metal salt which is capable of rapidly reacting with said base to form a gelatinous precipitate, using a sufficient quantity of said acidic solution to neutralize base sprayed on said granules in step (b) and form a gelatinous precipitate of metal ion-exchange material and a by-product salt as a coating on the surface of said granules, the amount of said acidic solution of metal salt being insufficient to deposit in pores of said granules, and the total quantity of gelatinous precipitate formed being limited to prevent encapsulation of said granules by said precipitate; and
   (d) washing said particles to remove said byproduct salt.

2. The method of claim 1 wherein said precipitated ion-exchange material is a hydrous oxide or silicate of at least one metal from Groups IVa, Va, VIIa, IVb.

3. The method of claim 1 wherein said precipitated ion-exchange material is a hydrous oxide or silicate of titanium or mixtures thereof.

4. The method of claim 1 wherein said ion-exchange material is amorphous.

5. The method of claim 1 wherein said porous support is activated carbon and said precipitated ion-exchange material is an amorphous hydrous oxide or silicate of titanium.

6. The method of claim 1 wherein the pores of said support are predominantly micropores.

7. The method of claim 1 wherein said support contains micro, meso and macropores and the volume of said micro and mesopores of said support is substantially unchanged as a result of the presence thereon of said ionexchange material.

8. The method of claim 1 wherein said solution of base is viscous.

9. The method of claim 1 wherein said solution of base comprises sodium silicate.

10. The method of claim 1 wherein the said solution of base comprises sodium hydroxide.

11. The method of claim 1 wherein said solution of base comprises a mixture of sodium silicate and sodium hydroxide.

12. The method of claim 1 wherein said granules comprise activated carbon, said solution of base comprises sodium silicate and said precipitate of ion exchange material is an amorphous hydrous silicate of titanium.

13. The method of claim 1 wherein said granules comprise activated carbon, said solution of base consists of sodium hydroxide, and said precipitate of ion exchange material is an amorphous hydrous oxide of titanium.

14. The method of claim 1 wherein step (c) is carried out immediately after carrying out step (b).

* * * * *